United States Patent
Kimura et al.

(10) Patent No.: US 7,359,125 B2
(45) Date of Patent: Apr. 15, 2008

(54) TWO-LENS-GROUP ZOOM LENS SYSTEM

(75) Inventors: Yoko Kimura, Ayase (JP); Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 41 days.

(21) Appl. No.: 11/516,708

(22) Filed: Sep. 7, 2006

(65) Prior Publication Data

US 2007/0070520 A1   Mar. 29, 2007

(30) Foreign Application Priority Data

Sep. 29, 2005 (JP) ............................. 2005-285398

(51) Int. Cl.
  *G02B 15/14*   (2006.01)
(52) U.S. Cl. ....................... 359/680; 359/691
(58) Field of Classification Search ........ 359/680–682, 359/691
  See application file for complete search history.

(56) References Cited

U.S. PATENT DOCUMENTS

| 4,477,153 A | 10/1984 | Suda et al. |
| 4,603,948 A | 8/1986 | Imai |
| 5,182,673 A | 1/1993 | Kikuchi et al. |
| 5,969,881 A | 10/1999 | Konno |
| 6,940,655 B2 * | 9/2005 | Sato ............................ 359/680 |
| 2005/0168831 A1 * | 8/2005 | Sato ............................ 359/680 |
| 2007/0041102 A1 * | 2/2007 | Kuo ............................ 359/680 |

FOREIGN PATENT DOCUMENTS

| JP | 10-206733 A | 8/1998 |
| JP | 2001-166206 A | 6/2001 |

* cited by examiner

*Primary Examiner*—Scott J. Sugarman
*Assistant Examiner*—Darryl J. Collins
(74) *Attorney, Agent, or Firm*—Miles & Stockbridge P.C.

(57) ABSTRACT

Providing a two-lens-group zoom lens system that has a wide angle of view, a fast aperture ratio with an f-number of about 2.8, a high zoom ratio, and high optical performance, and is easy to be manufactured. The zoom lens system is composed of, in order from an object, a first lens group G1 having negative refractive power, and a second lens group G2 having positive refractive power. Zooming is carried out by varying a distance between the first lens group G1 and the second lens group G2. The second lens group G2 includes, in order from the object, a first positive lens component L1, an aperture stop S, a second positive lens component L2, and a negative lens L3. Given conditional expression is satisfied.

18 Claims, 6 Drawing Sheets

TWO-LENS-GROUP ZOOM LENS SYSTEM

The disclosure of the following priority application is herein incorporated by reference:

Japanese Patent Application No. 2005-285398 filed on Sep. 29, 2005.

BACKGROUND OF THE INVENTION

1. Field of the Invention

The present invention relates to a negative leading type two-lens-group zoom lens system and in particular to a fast super wide-angle zoom lens system having a wide angle of view.

2. Related Background Art

Although a lot of so-called wide-angle zoom lens systems have been proposed, there have been proposed very small number of wide-angle zoom lens systems covering entire super wide-angle range with a maximum angle of view of 110 degrees or more, and among them extremely small number of super wide-angle lens system having a fast aperture ratio with an f-number of about 2.8 have been proposed in, for example, Japanese Patent Application Laid-Open No. 2001-166206.

Recently, with increasing digitization of a camera, further higher optical performance has been necessary for even a wide-angle zoom lens system.

However, the zoom lens system disclosed in Japanese Patent Application Laid-Open No. 2001-166206 has a large diameter aspherical lens as a front lens. Since such an aspherical lens is difficult to be manufactured, there has been a problem that the zoom lens system itself becomes difficult to be manufactured.

SUMMARY OF THE INVENTION

The present invention is made in view of the aforementioned problems and has an object to provide a two-lens-group zoom lens system that has a wide angle of view, a fast aperture ratio with an f-number of about 2.8, a high zoom ratio, and high resolving power, and is easy to be manufactured.

According to a first aspect of the present invention, there is provided a two-lens-group zoom lens system composed of, in order from an object, a first lens group having negative refractive power, and a second lens group having positive refractive power. Zooming is carried out by varying a distance between the first lens group and the second lens group. The second lens group includes, in order from the object, a first positive lens component, an aperture stop, a second positive lens component, and a negative lens. The following conditional expression (1) is satisfied:

$$0.065 < D1/D2 < 0.3 \tag{1}$$

where D1 denotes a distance along the optical axis between the second positive lens component and the negative lens, and D2 denotes a distance between the object side lens surface of the first positive lens component and an image plane in a wide-angle end state upon focusing on infinity.

In a two-lens-group zoom lens system according to the first aspect of the present invention, the following conditional expression (2) is preferably satisfied:

$$-1.0 < D1/f1 \leq -0.27 \tag{2}$$

where D1 denotes a distance along the optical axis between the second positive lens component and the negative lens, and f1 denotes a focal length of the first lens group.

In a two-lens-group zoom lens system according to the first aspect of the present invention, the following conditional expression (3) is preferably satisfied:

$$0.25 < fw/f2 < 0.5 \tag{3}$$

where fw denotes a focal length of the two-lens-group zoom lens system in the wide-angle end state, and f2 denotes a focal length of the second lens group.

In a two-lens-group zoom lens system according to the first aspect of the present invention, it is preferable that at least one of the first positive lens component and the second positive lens component is a cemented lens constructed by a positive lens cemented with a negative lens, and the following conditional expression (4) is preferably satisfied:

$$0.25 < vdn/vdp < 0.95 \tag{4}$$

where vdn denotes Abbe number of a glass material of the negative lens in the cemented lens at d-line (wavelength λ=587.56 nm), and vdp denotes Abbe number of a glass material of the positive lens in the cemented lens at d-line (wavelength λ=587.56 nm).

In a two-lens-group zoom lens system according to the first aspect of the present invention, it is preferable that the first positive lens component can be moved for focusing.

In a two-lens-group zoom lens system according to the first aspect of the present invention, it is preferable that the second lens group has at least one aspherical lens.

In a two-lens-group zoom lens system according to the first aspect of the present invention, it is preferable that the second lens group includes at least three pairs of cemented lenses.

In a two-lens-group zoom lens system according to the first aspect of the present invention, it is preferable that the first lens group includes, in order from the object, at least three negative lenses.

In a two-lens-group zoom lens system according to the first aspect of the present invention, it is preferable that the at least three negative lenses in the first lens group are negative meniscus lenses.

In a two-lens-group zoom lens system according to the first aspect of the present invention, it is preferable that the first lens group includes, in order from the object, at least four negative lenses and at least one positive lens.

In a two-lens-group zoom lens system according to the first aspect of the present invention, it is preferable that at least three of the at least four negative lenses are negative meniscus lenses.

In a two-lens-group zoom lens system according to the first aspect of the present invention, it is preferable that the first lens group includes at least two aspherical surfaces.

In a two-lens-group zoom lens system according to the first aspect of the present invention, it is preferable that a zoom ratio is 1.50 or more.

According to a second aspect of the present invention, there is provided a method for forming an image of an object and varying a focal length of a zoom lens system that includes, in order from the object, a first lens group having negative refractive power, and a second lens group having positive refractive power, comprising steps of varying the focal length by changing a distance between the first lens group and the second lens group when the zoom lens system moves from a wide-angle end state to a telephoto end state, providing the second lens group including, in order from the object, a first positive lens component, an aperture stop, a second positive lens component, and a negative lens, and satisfying the following conditional expression:

$$0.065 < D1/D2 < 0.3$$

where D1 denotes a distance along the optical axis between the second positive lens component and the negative lens, and D2 denotes a distance between the object side lens surface of the first positive lens component and an image plane in a wide-angle end state upon focusing on infinity.

In a two-lens-group zoom lens system according to the second aspect of the present invention, the following step is preferably included, satisfying the following conditional expression:

$$-1.0 < D1/f1 \leq -0.27$$

where D1 denotes a distance along the optical axis between the second positive lens component and the negative lens, and f1 denotes a focal length of the first lens group.

In a two-lens-group zoom lens system according to the second aspect of the present invention, the following step is preferably included, satisfying the following conditional expression:

$$0.25 < fw/f2 < 0.5$$

where fw denotes a focal length of the two-lens-group zoom lens system in the wide-angle end state, and f2 denotes a focal length of the second lens group.

Other features and advantages according to the present invention will be readily understood from the detailed description of the preferred embodiments in conjunction with the accompanying drawings.

BRIEF DESCRIPTION OF THE DRAWINGS

FIGS. 2A, 2B, and 2C are graphs showing various aberrations of the two-lens-group zoom lens system according to Example 1 focusing on infinity in which

FIGS. 4A, 4B, and 4C are graphs showing various aberrations of the two-lens-group zoom lens system according to Example 2 focusing on infinity in which

FIGS. 6A, 6B, and 6C are graphs showing various aberrations of the two-lens-group zoom lens system according to Example 3 focusing on infinity in which

DESCRIPTION OF THE MOST PREFERRED EMBODIMENTS

A two-lens-group zoom lens system according to an embodiment of the present invention is explained below.

In designing an objective optical system including a photographic lens, the most difficult problem is to satisfy both of an extremely wide angle of view and a fast aperture ratio at a time. This means that Seidel aberrations have to be corrected completely. Moreover, to design such an objective optical system as a zoom lens system is extremely difficult. Accordingly, there has been hardly proposed a zoom lens system having an angle of view, in an ordinary projection method, of (2ω=) 110 degrees or more, an f-number of about 2.8, and a zoom ratio of 1.7 or more, and such product has not ever existed. Here, the zoom ratio is a ratio of a focal length in a telephoto end state to that in the wide-angle end state of the zoom lens system.

The present invention makes it possible to develop an optical system which has such specifications never tried before as a two-lens-group zoom lens system having compactness capable of being used regularly, securing sufficient peripheral quantity of light, and having high optical performance.

The two-lens-group zoom lens system is composed of, in order from an object, a first lens group having negative refractive power, and a second lens group having positive refractive power. Zooming is carried out by varying a distance between the first lens group and the second lens group. The second lens group includes, in order from the object, a first positive lens component, an aperture stop, a second positive lens component, and a negative lens. The following conditional expression (1) is satisfied:

$$0.065 < D1/D2 < 0.3 \qquad (1)$$

where D1 denotes a distance along the optical axis between the second positive lens component and the negative lens, and D2 denotes a distance along the optical axis between the object side lens surface of the first positive lens component and an image plane in a wide-angle end state upon focusing on infinity.

With the above-described lens arrangement of the first positive lens component, the aperture stop, and the second positive lens component in the second lens group, the two-lens-group zoom lens system makes it possible to excellently correct spherical aberration.

One of the first positive lens component and the second positive lens component is a cemented lens constructed by one lens cemented with another lens having different Abbe numbers with each other, so that longitudinal chromatic aberration can be corrected excellently.

In this specification and the claims, the wording a "lens component" includes a "cemented lens" as well as a "single lens element".

In the two-lens-group zoom lens system, by securing a large distance along the optical axis between the second positive lens component and the negative lens in the second lens group, the principal point of the second lens group can be disposed to the object side as much as possible. This is because a working distance between the first lens group and the second lens group, which is a distance varied upon zooming, is to be secured. When the working distance is not sufficient, the zoom ratio becomes small.

To secure a large distance along the optical axis between the second positive lens component and the negative lens makes the exit pupil away from the image plane as well. Accordingly, this is suitable for a digital camera.

By making the negative lens to be a double concave negative lens, the sagittal image plane and sagittal coma can be corrected excellently.

By introducing an aspherical lens in the second lens group, correction of upper coma and distortion can further be carried out. It is more effective that the position of the introduced aspherical surface is near to the image plane as much as possible.

As described above, the configuration of the second lens group is suitable for a master lens in a two-lens-group zoom lens system having a wide angle of view and a fast aperture ratio.

Each conditional expression of the two-lens-group zoom lens system will be explained below.

Conditional expression (1) defines an appropriate range of a ratio of a distance along the optical axis between the second positive lens component and the negative lens in the second lens group to a distance along the optical axis between the object side lens surface of the first positive lens component and an image plane in the wide-angle end state upon focusing on infinity.

In the two-lens-group zoom lens system, when the ratio D1/D2 is equal to or falls below the lower limit of conditional expression (1), it becomes difficult to secure the working distance between the first lens group and the second lens group, and the position of the exit pupil becomes near to the image plane, so that it is undesirable. Moreover, curvature of field and lower coma in the wide-angle side, in particular, become worse, so that it is undesirable.

When the lower limit of conditional expression (1) is set to 0.07, the effect of the present invention can further be obtained. When the lower limit of conditional expression (1) is set to 0.08, the effect of the present invention can optimally be obtained.

On the other hand, in the two-lens-group zoom lens system, when the ratio D1/D2 is equal to or exceeds the upper limit of conditional expression (1), variation in lateral chromatic aberration and longitudinal chromatic aberration upon zoom becomes large as well as spherical aberration and curvature of field in the telephoto side and upper coma become large, so that it is undesirable.

When the upper limit of conditional expression (1) is set to 0.2, the effect of the present invention can optimally be obtained.

In a two-lens-group zoom lens system, the following conditional expression (2) is preferably satisfied:

$$-1.0 < D1/f1 \leq -0.27 \quad (2)$$

where D1 denotes a distance along the optical axis between the second positive lens component and the negative lens in the second lens group, and f1 denotes a focal length of the first lens group.

Conditional expression (2) defines an appropriate range of the ratio of a distance along the optical axis between the second positive lens component and the negative lens in the second lens group to a focal length of the first lens group.

In the two-lens-group zoom lens system, when the ratio D1/f1 is equal to or falls below the lower limit of conditional expression (2), negative refractive power of the first lens group becomes excessive, so that curvature of field, distortion, and lower coma in the wide-angle end state, in particular, become worse, and peripheral quantity of light becomes lower.

When the lower limit of conditional expression (2) is set to −0.5, the effect of the present invention can optimally be obtained.

On the other hand, in the two-lens-group zoom lens system, when the ratio D1/f1 exceeds the upper limit of conditional expression (2), it becomes difficult to secure sufficient working distance between the first lens group and the second lens group, and the position of the exit pupil becomes near to the image plane, so that it is undesirable.

When the upper limit of conditional expression (2) is set to −0.3, the effect of the present invention can optimally be obtained.

In a two-lens-group zoom lens system, the following conditional expression (3) is preferably satisfied:

$$0.25 < fw/f2 < 0.5 \quad (3)$$

where fw denotes a focal length of the two-lens-group zoom lens system in the wide-angle end state, and f2 denotes a focal length of the second lens group.

Conditional expression (3) defines an appropriate range of a ratio of a focal length of the two-lens-group zoom lens system in the wide-angle end state to that of the second lens group.

In the two-lens-group zoom lens system, when the ratio fw/f2 is equal to or falls below the lower limit of conditional expression (3), in particular, curvature of field, lower coma, and distortion become worse, and peripheral quantity of light becomes low.

When the lower limit of conditional expression (3) is set to 0.3, the effect of the present invention can optimally be obtained.

On the other hand, in the two-lens-group zoom lens system, when the ratio fw/f2 is equal to or exceeds the upper limit of conditional expression (3), it becomes difficult to secure a back focal length, and, in particular, spherical aberration and coma in the telephoto end state become worse, so that it is undesirable.

When the upper limit of conditional expression (3) is set to 0.45, the effect of the present invention can further be obtained. When the upper limit of conditional expression (3) is set to 0.40, the effect of the present invention can optimally be obtained.

In a two-lens-group zoom lens system, it is preferable that at least one of the first positive lens component and the second positive lens component in the second lens group is a cemented lens constructed by a positive lens cemented with a negative lens, and the following conditional expression (4) is preferably satisfied:

$$0.25 < vdn/vdp < 0.95 \quad (4)$$

where vdn denotes Abbe number of a glass material of the negative lens in the cemented lens at d-line (wavelength λ=587.56 nm), and vdp denotes Abbe number of a glass material of the positive lens in the cemented lens at d-line (wavelength λ=587.56 nm).

When at least one of the first positive lens component and the second positive lens component in the second lens group is a cemented lens constructed by a negative lens and a positive lens, conditional expression (4) defines an appropriate range of a ratio of Abbe number of the negative lens to that of the positive lens in the cemented lens.

In the two-lens-group zoom lens system, when the ratio vdn/vdp is equal to or falls below the lower limit of conditional expression (4), since an expensive glass material has to be used, manufacturing cost becomes high. Moreover, chromatic aberration is excessively corrected to make longitudinal chromatic aberration worse, so that it is undesirable.

When the lower limit of conditional expression (4) is set to 0.4, the effect of the present invention can further be obtained. When the lower limit of conditional expression (4) is set to 0.5, the effect of the present invention can optimally be obtained.

On the other hand, in the two-lens-group zoom lens system, when the ratio vdn/vdp is equal to or exceeds the upper limit of conditional expression (4), difference in Abbe numbers becomes small and correction of chromatic aberration becomes insufficient to make longitudinal chromatic aberration worse, so that it is undesirable.

When the upper limit of conditional expression (4) is set to 0.92, the effect of the present invention can optimally be obtained.

In the two-lens-group zoom lens system, it is preferable that the first positive lens component in the second lens group is movable upon focusing. By configuring the zoom lens system to carry out focusing by the first positive lens component, variation in curvature of field can be lowered.

In the two-lens-group zoom lens system, it is preferable that the second lens group includes at least one aspherical lens. With this configuration, spherical aberration and upper coma in the telephoto side can be corrected excellently.

The two-lens-group zoom lens system according to each Example will be explained below with reference to accompanying drawings.

EXAMPLE 1

Figure 1:
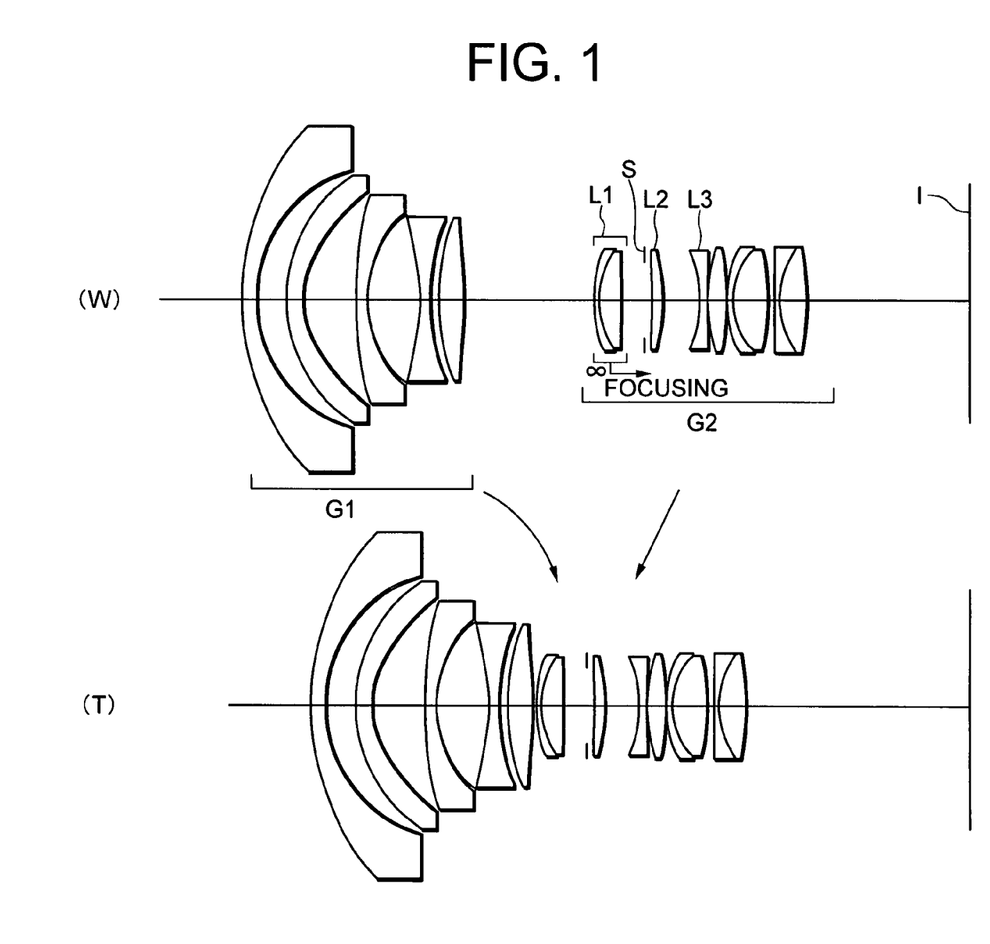
FIG. 1 is a diagram showing a lens configuration of a two-lens-group zoom lens system according to Example 1 of the present invention together with zooming trajectories of respective lens groups.

FIG. 1 is a diagram showing a lens configuration of a two-lens-group zoom lens system according to Example 1 together with zooming trajectories of respective lens groups.

The two-lens-group zoom lens system according to Example 1 includes, in order from an object, a first lens group G1 having negative refractive power, and a second lens group G2 having positive refractive power.

The second lens group G2 includes, in order from the object, a first positive lens component L1, an aperture stop S, a second positive lens component L2, and a negative lens L3. The first positive lens component L1 is a focusing lens group that is moved upon focusing. The most image side lens surface in the second lens group G2 is an aspherical surface. Two aspherical surfaces are provided in the first lens group G1.

In Example 1, the first positive lens component L1 is composed of a cemented lens constructed by, in order from the object, a negative meniscus lens having a convex surface facing the object cemented with a positive meniscus lens having a convex surface facing the object. The second positive lens component L2 is composed of a positive meniscus lens having a convex surface facing the image.

In the two-lens-group zoom lens system according to Example 1, zooming from a wide-angle end state to a telephoto end state is carried out by moving the first lens group G1 and the second lens group G2 such that a distance between the first lens group G1 and the second lens group G2 decreases In the two-lens-group zoom lens system according to Example 1, focusing on a close object is carried out by moving the focusing lens group L1, which is a portion of the second lens group G2, and is possible up to the shooting distance of 300 mm.

Various values associated with the two-lens-group zoom lens system according to Example 1 are listed in Table 1.

In [Specifications], f denotes the focal length, $2\omega$ denotes an angle of view, and FNO denotes the f-number.

In [Lens Data], the left most column shows the lens surface number counted in order from the object side, the second column shows a radius of curvature "ri" of the i-th lens surface, the third column shows a distance "di" along the optical axis between the lens surfaces ri and ri+1, the fourth column shows Abbe number of the medium "vi" between the lens surfaces ri and ri+1 at d-line (wavelength $\lambda=587.56$ nm), and the fifth column shows refractive index "ni" of the medium between the lens surfaces ri and ri+1 at d-line (wavelength $\lambda=587.56$ nm). The position of an aspherical surface is expressed by attaching "*" to the right side of the surface number in [Lens Data] and paraxial radius of curvature is shown in the second column. In [Lens Data], refractive index of the air n=1.000000 is omitted.

In [Aspherical Data], "$\kappa$" denotes a conical coefficient, "Ci" denotes an i-th order aspherical coefficient. "E-n" denotes "$\times 10^{-n}$". In each Example, an aspherical surface is exhibited by the following expression:

$$S(y)=(y^2/R)/[1+[1-\kappa(y^2/R^2)]^{1/2}]+C4xy^4+C6xy^6+C8xy^8+C10xy^{10}+C12xy^{12}+C14xy^{14}$$

where y denotes a vertical height from the optical axis, S(y) denotes a sag amount at a height y, R denotes a radius of curvature of a reference sphere, $\kappa$ denotes a conical coefficient, and Cn denotes aspherical coefficient of n-th order.

In [Variable Distances], $\beta$ denotes the imaging magnification, R denotes a shooting distance, and W, M, and T denote a wide-angle end state, an intermediate focal length state, and a telephoto end state T, respectively.

In the tables for various values, "mm" is generally used for the unit of length such as the focal length, the radius of curvature, and the distance to the next lens surface. However, since an optical system proportionally enlarged or reduced its dimension can be obtained similar optical performance, the unit is not necessary to be limited to "mm", and any other suitable unit can be used.

The explanation of reference symbols is the same in the other Examples, so that duplicated explanations are omitted.

TABLE 1

| [Specifications] | | |
|---|---|---|
| | W | T |
| f = | 14.4 | 23.8 |
| 2ω = | 114.7 | 83.8° |
| FNO = | 2.88 | |

| [Lens Data] | | | |
|---|---|---|---|
| r | d | ν | n |

| | r | d | ν | n |
|---|---|---|---|---|
| 1 | 60.3937 | 3.5000 | 46.58 | 1.804000 |
| 2 | 32.2703 | 7.0835 | | |
| 3 | 35.5000 | 4.0000 | 55.34 | 1.677900 |
| 4* | 19.5117 | 12.8951 | | |
| 5 | 87.0449 | 2.5000 | 52.67 | 1.741000 |
| 6 | 26.3306 | 0.3000 | 38.09 | 1.553890 |
| 7* | 30.2448 | 12.6887 | | |
| 8 | −67.9930 | 2.5896 | 82.52 | 1.497820 |
| 9 | 48.0626 | 2.0000 | | |
| 10 | 48.4880 | 5.9634 | 39.59 | 1.804400 |
| 11 | −181.2948 | d11 | | |
| 12 | 34.6184 | 1.0000 | 42.72 | 1.834810 |
| 13 | 19.4637 | 5.2931 | 47.04 | 1.623740 |
| 14 | 611.5990 | d14 | | |

TABLE 1-continued

| 15> | | 1.6689 | Aperture Stop S | |
|---|---|---|---|---|
| 16 | −265.5383 | 2.6545 | 64.10 | 1.516800 |
| 17 | −47.2569 | 9.0744 | | |
| 18 | −27.9322 | 1.6819 | 42.72 | 1.834810 |
| 19 | 138.6775 | 0.1000 | | |
| 20 | 35.6745 | 4.4701 | 50.80 | 1.570990 |
| 21 | −71.8719 | 0.1000 | | |
| 22 | 27.2079 | 1.3817 | 49.45 | 1.772789 |
| 23 | 16.4317 | 8.4910 | 82.52 | 1.497820 |
| 24 | −53.0000 | 1.7210 | | |
| 25 | 1336.7107 | 1.0000 | 40.94 | 1.806100 |
| 26 | 20.3824 | 6.3537 | 61.18 | 1.589130 |
| 27* | −60.1135 | Bf | | |

[Aspherical Data]

Surface Number 4

$\kappa = 0.0913$
$C4 = -5.1181E-07$
$C6 = 7.1056E-10$
$C8 = -1.9817E-11$
$C10 = 1.9226E-14$
$C12 = -0.60945E-17$
$C14 = 0.0$ Surface Number 7

$\kappa = -6.3795$
$C4 = 4.2239E-05$
$C6 = -7.8972E-08$
$C8 = 2.9788E-10$
$C10 = -5.9331E-13$
$C12 = 0.60285E-15$
$C14 = -0.74037E-19$ Surface Number 27

$\kappa = 6.0164$
$C4 = 1.9855E-05$
$C6 = 6.9569E-09$
$C8 = 1.5384E-10$
$C10 = -5.8393E-13$
$C12 = 0.0$
$C14 = 0.0$

[Variable Distances]

| | W | M | T |
|---|---|---|---|
| <Focusing on infinity> | | | |
| f | 14.4 | 18.0 | 23.8 |
| D0 | ∞ | ∞ | ∞ |
| d11 | 31.93 | 16.37 | 1.20 |
| d14 | 5.86 | 5.86 | 5.86 |
| Bf | 38.70 | 44.55 | 53.97 |
| <Focusing on an intermediate distance> | | | |
| β | −0.025 | −0.025 | −0.025 |
| D0 | 536.77 | 682.52 | 916.19 |
| d11 | 33.18 | 17.33 | 1.95 |
| d14 | 4.61 | 4.90 | 5.11 |
| Bf | 38.70 | 44.55 | 53.97 |
| <Focusing on a close object> | | | |
| R | 300 | 300 | 300 |
| D0 | 125.00 | 134.71 | 140.46 |
| d11 | 36.36 | 20.38 | 5.21 |
| d14 | 1.43 | 1.85 | 1.85 |
| Bf | 38.70 | 44.55 | 53.97 |

[Values for Conditional Expressions]

(1): D1/D2 = 0.101
(2): D1/f1 = −0.345
(3): fw/f2 = 0.337
(4): vdn/vdp = 0.91

Figure 2A:
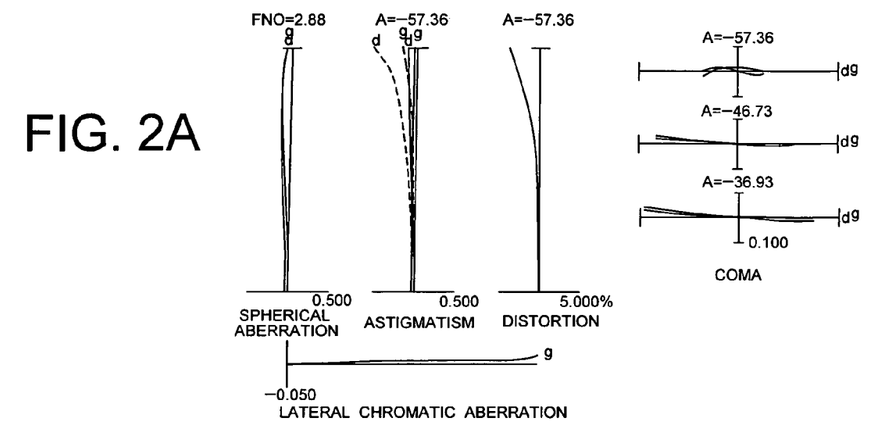
FIG. 2A shows various aberrations in a wide-angle end state W.
Figure 2B:
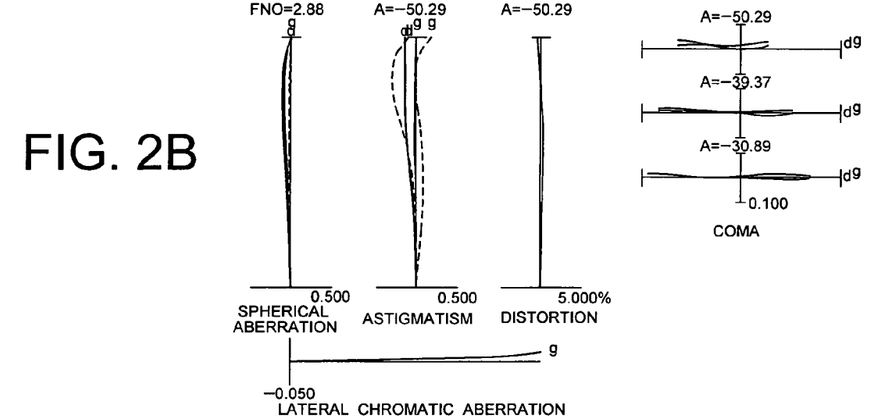
FIG. 2B shows various aberrations in an intermediate focal length state M.
Figure 2C:
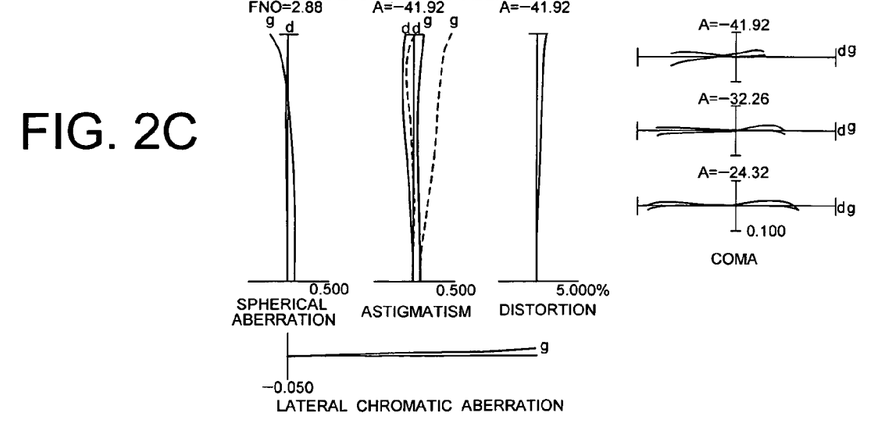
FIG. 2C shows various aberrations in a telephoto end state T.

FIGS. 2A, 2B, and 2C are graphs showing various aberrations of the two-lens-group zoom lens system according to Example 1 focusing on infinity in which FIG. 2A shows various aberrations in a wide-angle end state W, FIG. 2B shows various aberrations in an intermediate focal length state M, and FIG. 2C shows various aberrations in a telephoto end state T.

In respective graphs, FNO denotes an f-number, A denotes a half angle of view (unit: degree). In the graphs showing spherical aberration, the f-number with respect to the maximum aperture is shown. In graphs showing astigmatism and distortion, the maximum value of a half angle of view A is shown.

In graphs showing coma, coma with respect to each half angle of view A is shown. In respective graphs, d denotes aberration curve at d-line (wavelength λ=587.56 nm), and g denotes aberration curve at g-line (wavelength λ=435.84 nm). In the graph showing astigmatism, a solid line indicates a sagittal image plane, and a broken line indicates a meridional image plane. The above-described explanation regarding various aberration graphs is the same as the other Examples.

As is apparent from the respective graphs, the two-lens-group zoom lens system according to Example 1 shows superb optical performance as a result of good corrections to various aberrations in the wide-angle end state, in the intermediate focal length state, and in the telephoto end state.

EXAMPLE 2

Figure 3:
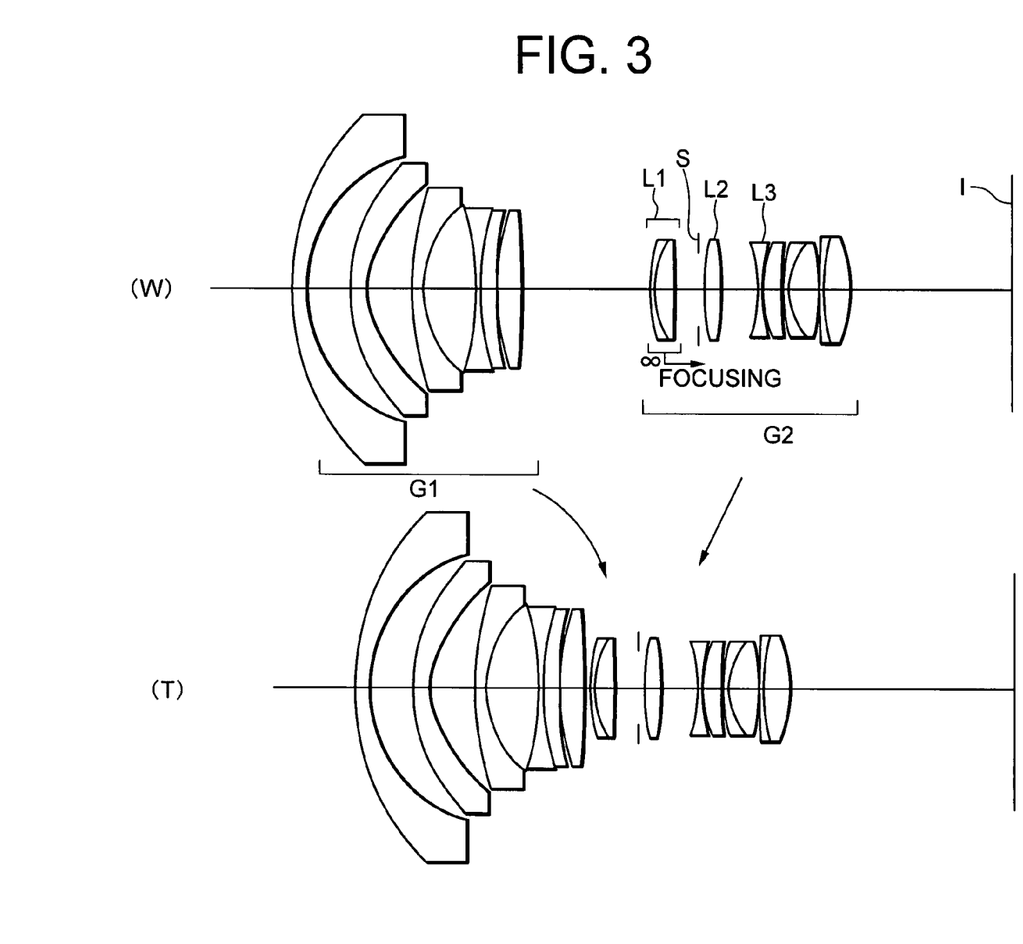
FIG. 3 is a diagram showing a lens configuration of a two-lens-group zoom lens system according to Example 2 of the present invention together with zooming trajectories of respective lens groups.

FIG. 3 is a diagram showing a lens configuration of a two-lens-group zoom lens system according to Example 2 together with zooming trajectories of respective lens groups.

The two-lens-group zoom lens system according to Example 2 includes, in order from an object, a first lens group G1 having negative refractive power, and a second lens group G2 having positive refractive power.

The second lens group G2 includes, in order from the object, a first positive lens component L1, an aperture stop S, a second positive lens component L2, and a negative lens L3. The first positive lens component L1 is a focusing lens group that is moved upon focusing. The most image side lens surface in the second lens group G2 is an aspherical surface. Two aspherical surfaces are provided in the first lens group G1.

In Example 2, the first positive lens component L1 is composed of a cemented lens constructed by, in order from the object, a negative meniscus lens having a convex surface facing the object cemented with a double convex positive lens. The second positive lens component L2 is composed of a double convex positive lens.

In the two-lens-group zoom lens system according to Example 2, zooming from a wide-angle end state to a telephoto end state is carried out by moving the first lens group G1 and the second lens group G2 such that a distance between the first lens group G1 and the second lens group G2 decreases.

In the two-lens-group zoom lens system according to Example 2, focusing on a close object is carried out by moving the focusing lens group L1 which is a portion of the second lens group G2, and is possible up to the shooting distance of 300 mm.

Various values of the two-lens-group zoom lens system according to Example 2 are listed in Table 2.

TABLE 2

[Specifications]

|  | W | T |
|---|---|---|
| f = | 14.4 | 23.8 |
| 2ω = | 114.7 | 83.8° |
| FNO = | 2.88 | |

[Lens Data]

| | r | d | ν | n |
|---|---|---|---|---|
| 1 | 56.9121 | 3.5000 | 45.37 | 1.796681 |
| 2 | 32.1468 | 10.7980 | | |
| 3 | 40.3407 | 4.0000 | 55.34 | 1.677900 |
| 4* | 18.9364 | 11.0511 | | |
| 5 | 67.5881 | 2.5000 | 52.64 | 1.740999 |
| 6 | 24.5702 | 0.3000 | 38.09 | 1.553890 |
| 7* | 27.6680 | 12.8700 | | |
| 8 | −70.8839 | 1.0000 | 82.52 | 1.497820 |
| 9 | 52.2167 | 3.9475 | 35.70 | 1.625882 |
| 10 | 87.3997 | 0.1632 | | |
| 11 | 53.5952 | 6.0276 | 37.16 | 1.834000 |
| 12 | −428.5366 | d12 | | |
| 13 | 36.1363 | 1.0000 | 37.20 | 1.834000 |
| 14 | 20.5624 | 5.0757 | 43.71 | 1.605620 |
| 15 | −797.7798 | d15 | | |
| 16> | | 1.5000 | Aperture Stop S | |
| 17 | 57.8205 | 3.8995 | 81.54 | 1.496999 |
| 18 | −70.7712 | 9.0740 | | |
| 19 | −33.3410 | 1.0000 | 33.89 | 1.803834 |
| 20 | 40.3001 | 0.1000 | | |
| 21 | 24.2732 | 4.6437 | 28.46 | 1.728250 |
| 22 | 127.1802 | 0.3699 | | |
| 23 | 37.3740 | 1.3816 | 37.16 | 1.834000 |
| 24 | 15.2851 | 7.2505 | 90.28 | 1.455999 |
| 25 | −53.3415 | 0.1000 | | |
| 26 | 183.4769 | 1.0000 | 42.71 | 1.834807 |
| 27 | 44.9959 | 6.3623 | 61.13 | 1.589130 |
| 28* | −33.7951 | Bf | | |

[Aspherical Data]

Surface Number 4

κ = −0.0802
C4 = −1.3215E−06
C6 = 7.5854E−09
C8 = −5.4625E−11
C10 = 9.5721E−14
C12 = −0.53878E−16
C14 = 0.0

Surface Number 7

κ = −1.0473
C4 = 2.6047E−05
C6 = −1.8488E−08
C8 = 2.0819E−10
C10 = −5.9270E−13
C12 = 0.60018E−15
C14 = −0.74037E−19

Surface Number 28

κ = 3.7752
C4 = 1.6048E−05
C6 = 4.9751E−09
C8 = 1.0564E−10
C10 = −4.4235E−13
C12 = 0.0
C14 = 0.0

[Variable Distances]

| | W | M | T |
|---|---|---|---|

<Focusing on infinity>

| f | 14.4 | 18.0 | 23.8 |
| D0 | ∞ | ∞ | ∞ |

TABLE 2-continued

| d12 | 31.53 | 16.17 | 1.20 |
| d15 | 5.86 | 5.86 | 5.86 |
| Bf | 38.70 | 44.75 | 54.50 |

<Focusing on an intermediate distance>

| β | −0.025 | −0.025 | −0.025 |
| D0 | 535.56 | 681.31 | 914.97 |
| d12 | 32.73 | 17.08 | 1.91 |
| d15 | 4.66 | 4.95 | 5.15 |
| Bf | 38.70 | 44.75 | 54.50 |

<Focusing on a close object>

| R | 300 | 300 | 300 |
| D0 | 125.00 | 134.31 | 139.53 |
| d12 | 35.74 | 19.98 | 5.01 |
| d15 | 1.64 | 2.05 | 2.05 |
| Bf | 38.70 | 44.75 | 54.50 |

[Values for Conditional Expressions]

(1): D1/D2 = 0.104
(2): D1/f1 = −0.354
(3): fw/f2 = 0.334
(4): νdn/νdp = 0.85

Figure 4A:
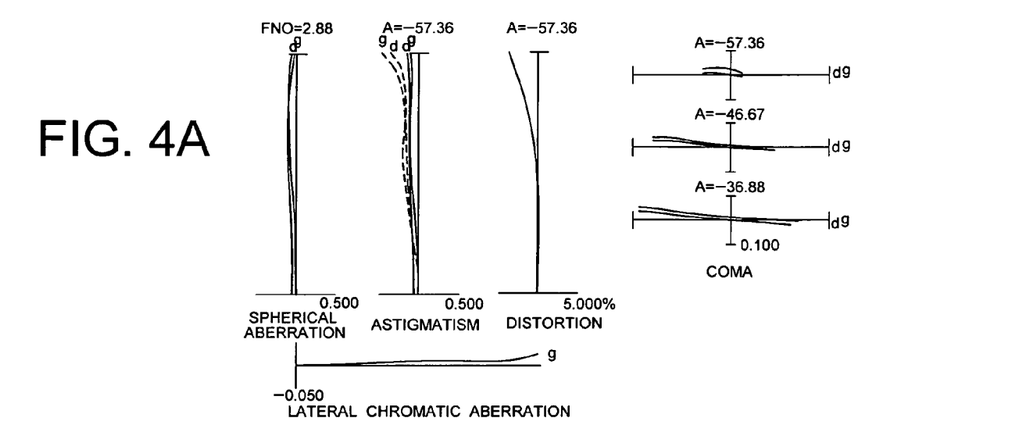
FIG. 4A shows various aberrations in a wide-angle end state W.
Figure 4B:
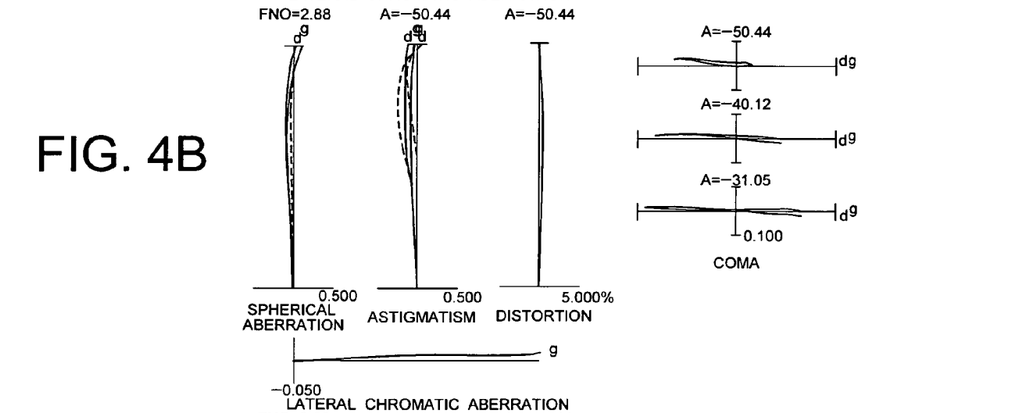
FIG. 4B shows various aberrations in an intermediate focal length state M.
Figure 4C:
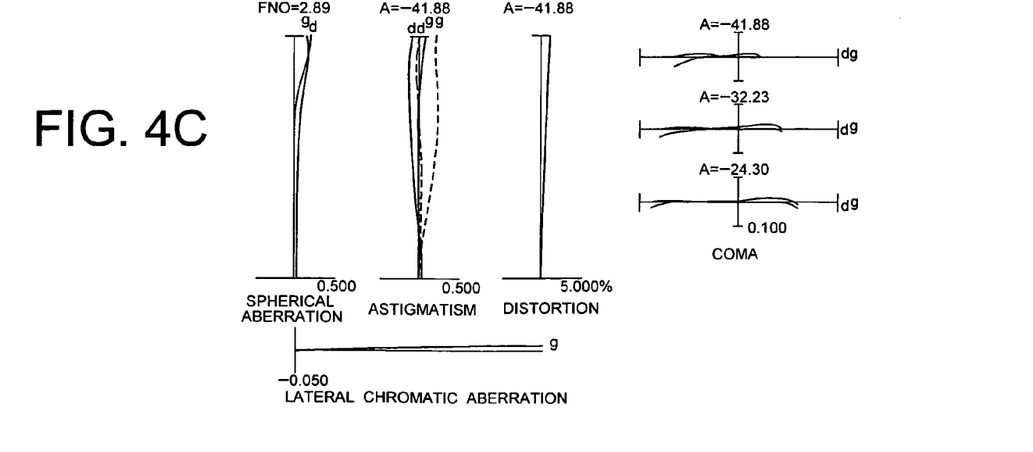
FIG. 4C shows various aberrations in a telephoto end state T.

FIGS. 4A, 4B, and 4C are graphs showing various aberrations of the two-lens-group zoom lens system according to Example 2 focusing on infinity in which FIG. 4A shows various aberrations in a wide-angle end state W, FIG. 4B shows various aberrations in an intermediate focal length state M, and FIG. 4C shows various aberrations in a telephoto end state T.

As is apparent from the respective graphs, the two-lens-group zoom lens system according to Example 2 shows superb optical performance as a result of good corrections to various aberrations in the wide-angle end state, in the intermediate focal length state, and in the telephoto end state.

EXAMPLE 3

Figure 5:
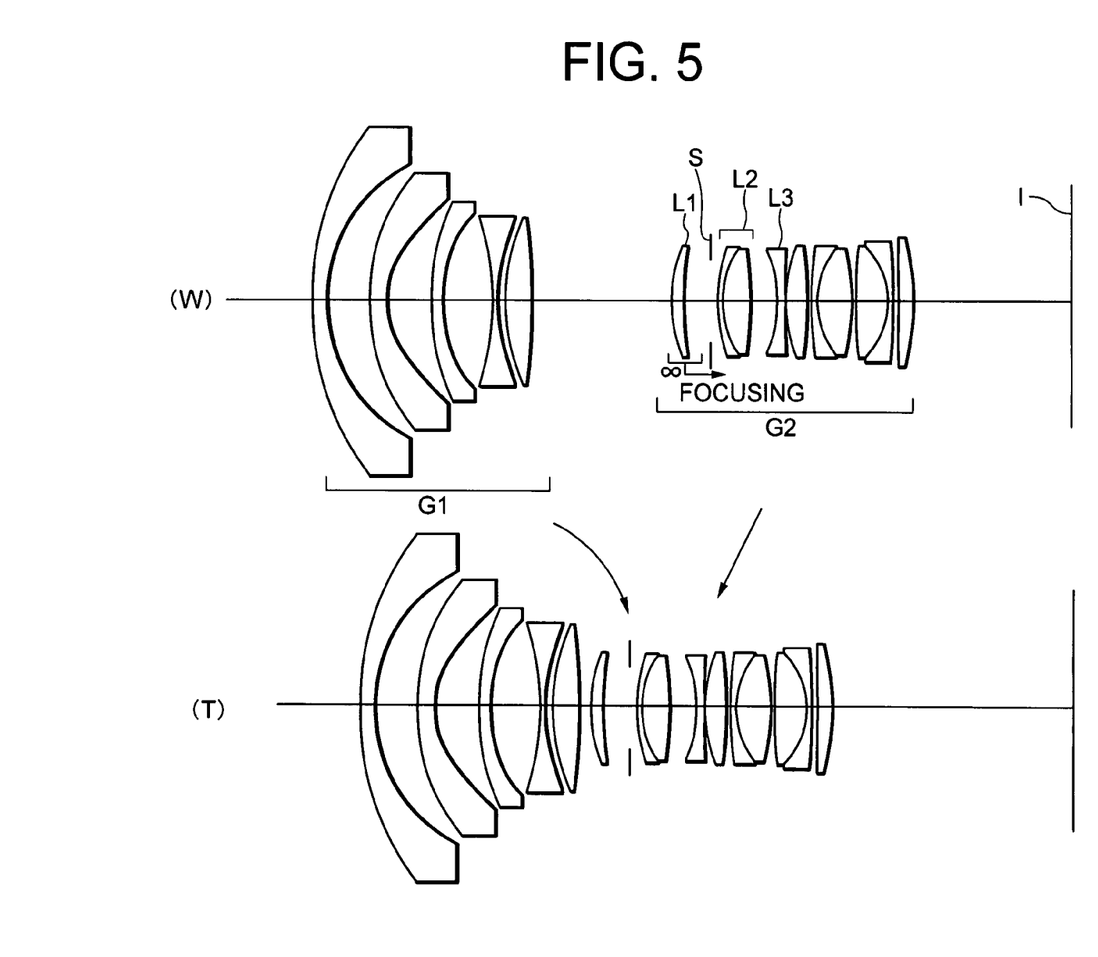
FIG. 5 is a diagram showing a lens configuration of a two-lens-group zoom lens system according to Example 3 of the present invention together with zooming trajectories of respective lens groups.

FIG. 5 is a diagram showing a lens configuration of a two-lens-group zoom lens system according to Example 3 together with zooming trajectories of respective lens groups.

The two-lens-group zoom lens system according to Example 3 includes, in order from an object, a first lens group G1 having negative refractive power, and a second lens group G2 having positive refractive power.

The second lens group G2 includes, in order from the object, a first positive lens component L1, an aperture stop S, a second positive lens component L2, and a negative lens L3. The first positive lens component L1 is a focusing lens group that is moved upon focusing. The most image side lens surface in the second lens group G2 is an aspherical surface. Two aspherical surfaces are provided in the first lens group G1.

In Example 3, the first positive lens component L1 is composed of a positive meniscus lens having a convex surface facing the object. The second positive lens component L2 is composed of a cemented lens constructed by, in order from the object, a negative meniscus lens having a convex surface facing the object cemented with a double convex positive lens.

In the two-lens-group zoom lens system according to Example 3, zooming from a wide-angle end state to a telephoto end state is carried out by moving the first lens group G1 and the second lens group G2 such that a distance between the first lens group G1 and the second lens group G2 decreases.

In the two-lens-group zoom lens system according to Example 3, focusing on a close object is carried out by moving the focusing lens group L1 which is a portion of the second lens group G2, and is possible up to the shooting distance of 300 mm.

Various values of the two-lens-group zoom lens system according to Example 3 are listed in Table 3.

TABLE 3

[Specifications]

|  | W | T |
|---|---|---|
| f = | 15.3 | 26.7 |
| 2ω = | 111.4 | 77.6° |
| FNO = | 3.2 | |

[Lens Data]

|  | r | d | ν | n |
|---|---|---|---|---|
| 1 | 63.7169 | 3.5000 | 46.58 | 1.804000 |
| 2 | 33.5072 | 10.3000 | | |
| 3 | 43.3838 | 4.0000 | 53.37 | 1.694300 |
| 4* | 17.2282 | 10.6000 | | |
| 5 | 50.5012 | 2.5000 | 52.67 | 1.741000 |
| 6 | 28.4514 | 0.3000 | 38.09 | 1.553890 |
| 7* | 33.2605 | 11.9500 | | |
| 8 | −65.8568 | 1.0000 | 82.56 | 1.497820 |
| 9 | 39.9794 | 2.0000 | | |
| 10 | 43.1281 | 6.3000 | 39.57 | 1.804400 |
| 11 | −233.3709 | d11 | | |
| 12 | 30.4383 | 2.7000 | 64.10 | 1.516800 |
| 13 | 61.5695 | d13 | | |
| 14> | | 1.5000 | Aperture Stop S | |
| 15 | 37.2420 | 1.0000 | 42.72 | 1.834810 |
| 16 | 19.5075 | 6.5782 | 47.04 | 1.623740 |
| 17 | −119.8537 | 6.5000 | | |
| 18 | −30.8199 | 1.8581 | 42.72 | 1.834810 |
| 19 | 130.1137 | 0.1000 | | |
| 20 | 28.7604 | 5.2883 | 50.88 | 1.658440 |
| 21 | −109.0732 | 0.9141 | | |
| 22 | 69.3767 | 1.3330 | 49.61 | 1.772500 |
| 23 | 17.4517 | 8.4070 | 82.56 | 1.497820 |
| 24 | −45.5775 | 1.0000 | | |
| 25 | 155.7609 | 7.5000 | 82.56 | 1.497820 |
| 26 | −17.9304 | 1.0000 | 44.20 | 1.785900 |
| 27 | −328.5906 | 1.6218 | | |
| 28 | 9050.9522 | 3.3019 | 61.18 | 1.589130 |
| 29* | −47.9982 | Bf | | |

[Aspherical Data]

Surface Number 4

κ = 0.3055
C4 = −8.69640E−06
C6 = −6.06090E−09
C8 = −4.57650E−12
C10 = −1.93020E−15
C12 = 0.0
C14 = 0.0

Surface Number 7

κ = −0.2488
C4 = 1.55260E−05
C6 = 9.73250E−09
C8 = −1.47570E−11
C10 = 3.03090E−14
C12 = 0.0
C14 = 0.0

Surface Number 29

κ = 0.2224
C4 = 5.36010E−06
C6 = 2.81120E−08
C8 = −1.41100E−10

TABLE 3-continued

C10 = 2.94100E−13
C12 = 0.0
C14 = 0.0

[Variable Distances]

|  | W | M | T |
|---|---|---|---|
| <Focusing on infinity> | | | |
| f | 15.292 | 19.880 | 26.748 |
| D0 | 0.000 | 0.000 | 0.000 |
| d11 | 33.782 | 17.223 | 3.052 |
| d13 | 6.792 | 6.792 | 6.792 |
| Bf | 37.004 | 45.150 | 57.345 |
| <Focusing on an intermediate distance> | | | |
| β | −0.025 | −0.025 | −0.025 |
| D0 | 575.526 | 760.478 | 1037.575 |
| d11 | 34.823 | 18.086 | 3.769 |
| d13 | 5.751 | 5.929 | 6.076 |
| Bf | 37.004 | 45.150 | 57.345 |
| <Focusing on a close object> | | | |
| R | 300 | 300 | 300 |
| D0 | 119.952 | 128.377 | 130.346 |
| d11 | 37.856 | 21.393 | 7.649 |
| d13 | 2.718 | 2.622 | 2.195 |
| Bf | 37.004 | 45.150 | 57.345 |

[Values for Conditional Expressions]

(1): D1/D2 = 0.069
(2): D1/f1 = −0.261
(3): fw/f2 = 0.346
(4): νdn/νdp = 0.9082

Figure 6A:
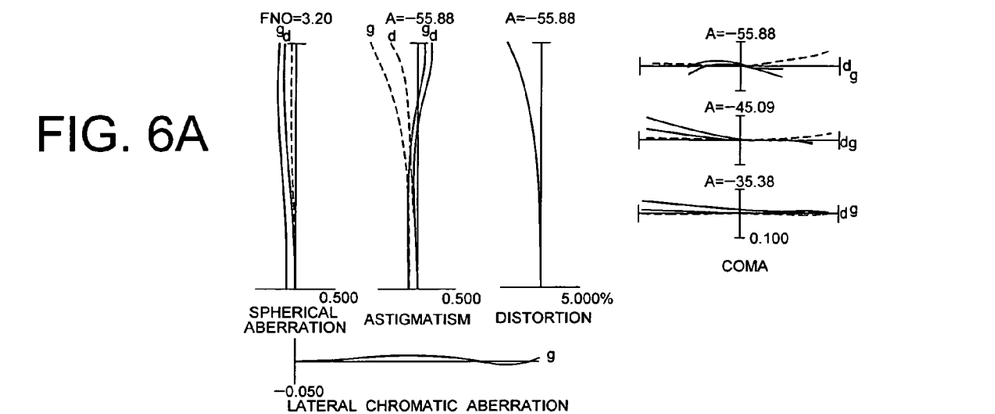
FIG. 6A shows various aberrations in a wide-angle end state W.
Figure 6B:
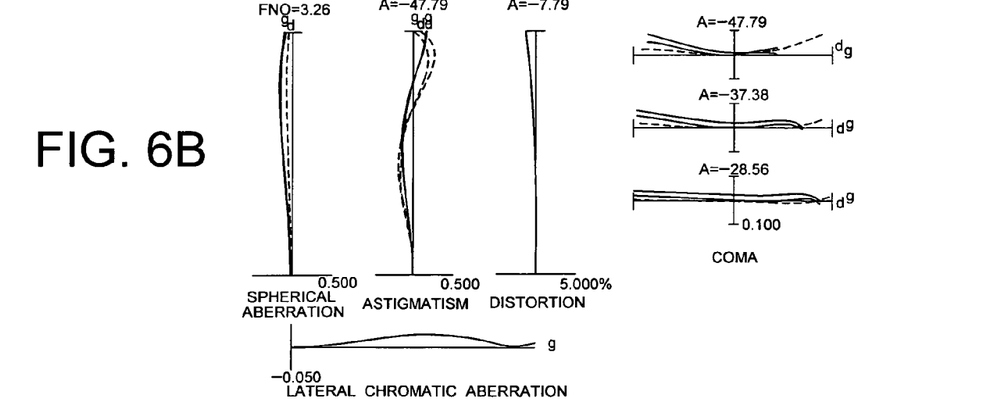
FIG. 6B shows various aberrations in an intermediate focal length state M.
Figure 6C:
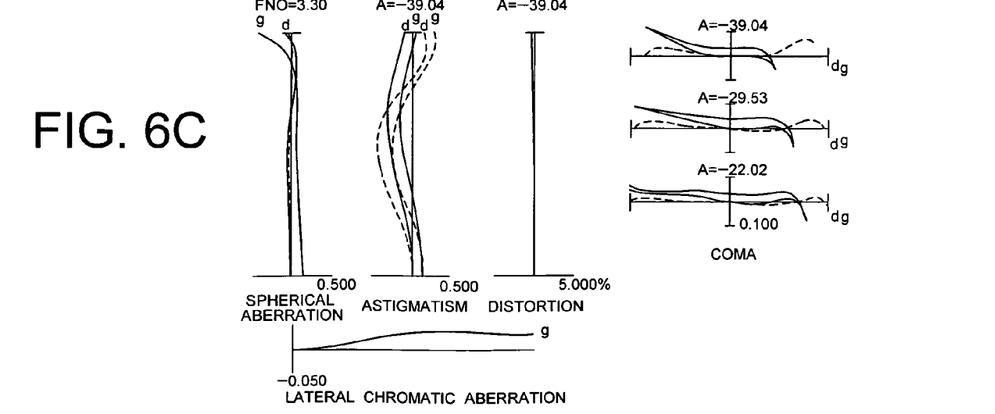
FIG. 6C shows various aberrations in a telephoto end state T.

FIGS. 6A, 6B, and 6C are graphs showing various aberrations of the two-lens-group zoom lens system according to Example 3 focusing on infinity in which FIG. 6A shows various aberrations in a wide-angle end state W, FIG. 6B shows various aberrations in an intermediate focal length state M, and FIG. 6C shows various aberrations in a telephoto end state T.

As is apparent from the respective graphs, the two-lens-group zoom lens system according to Example 3 shows superb optical performance as a result of good corrections to various aberrations in the wide-angle end state, in the intermediate focal length state, and in the telephoto end state.

As described above, the present invention makes it possible to provide a compact, fast, super wide-angle two-lens-group zoom lens system that has high optical performance with small variation in aberrations upon focusing, a wide angle of view of 2ω=110 degrees or more, a fast aperture ratio with an f-number of about 2.8, and high resolving power, and is easy to be manufactured.

Incidentally, it is needless to say that although a zoom lens system with a two-lens-group configuration is shown in each Example of the present invention, a zoom lens system simply added by a lens group to a two-lens-group configuration is included in the spirit of the present invention. Moreover, in the configuration of each lens group, a lens group simply added by additional lens elements to the lens group shown in each Example is included in the spirit or scope of the present invention.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A two-lens-group zoom lens system composed of, in order from an object, a first lens group having negative refractive power, and a second lens group having positive refractive power, zooming being carried out by varying a distance between the first lens group and the second lens group;

the second lens group including, in order from the object, a first positive lens component, an aperture stop, a second positive lens component, and a negative lens, and the following conditional expression being satisfied:

$$0.065 < D1/D2 < 0.3$$

where D1 denotes a distance along the optical axis between the second positive lens component and the negative lens, and D2 denotes a distance between the object side lens surface of the first positive lens component and an image plane in a wide-angle end state upon focusing on infinity.

2. The two-lens-group zoom lens system according to claim 1, wherein the following conditional expression is satisfied:

$$-1.0 < D1/f1 \leq -0.27$$

where D1 denotes a distance along the optical axis between the second positive lens component and the negative lens, and f1 denotes a focal length of the first lens group.

3. The two-lens-group zoom lens system according to claim 2, wherein the following conditional expression is satisfied:

$$0.25 < fw/f2 < 0.5$$

where fw denotes a focal length of the two-lens-group zoom lens system in the wide-angle end state, and f2 denotes a focal length of the second lens group.

4. The two-lens-group zoom lens system according to claim 1, wherein the following conditional expression is satisfied:

$$0.25 < fw/f2 < 0.5$$

where fw denotes a focal length of the two-lens-group zoom lens system in the wide-angle end state, and f2 denotes a focal length of the second lens group.

5. The two-lens-group zoom lens system according to claim 1, wherein at least one of the first positive lens component and the second positive lens component is a cemented lens constructed by a positive lens cemented with a negative lens.

6. The two-lens-group zoom lens system according to claim 5, wherein the following conditional expression is satisfied:

$$0.25 < vdn/vdp < 0.95$$

where vdn denotes Abbe number of a glass material of the negative lens in the cemented lens at d-line (wavelength $\lambda = 587.56$ nm), and vdp denotes Abbe number of a glass material of the positive lens in the cemented lens at d-line (wavelength $\lambda = 587.56$ nm).

7. The two-lens-group zoom lens system according to claim 1, wherein the first positive lens component can be moved for focusing.

8. The two-lens-group zoom lens system according to claim 1, wherein the second lens group includes at least one aspherical lens.

9. The two-lens-group zoom lens system according to claim 1, wherein the second lens group includes at least three pairs of cemented lenses.

10. The two-lens-group zoom lens system according to claim 1, wherein the first lens group includes, in order from the object, at least three negative lenses.

11. The two-lens-group zoom lens system according to claim 10, wherein the at least three negative lenses in the first lens group are negative meniscus lenses.

12. The two-lens-group zoom lens system according to claim 1, wherein the first lens group includes, in order from the object, at least four negative lenses and at least one positive lens.

13. The two-lens-group zoom lens system according to claim 12, wherein at least three of the at least four negative lenses are negative meniscus lenses.

14. The two-lens-group zoom lens system according to claim 1, wherein the first lens group includes at least two aspherical surfaces.

15. The two-lens-group zoom lens system according to claim 1, wherein a zoom ratio is 1.50 or more.

16. A method for forming an image of an object and varying a focal length of a zoom lens system that includes, in order from the object, a first lens group having negative refractive power, and a second lens group having positive refractive power, comprising steps of:

varying the focal length by changing a distance between the first lens group and the second lens group when the zoom lens system moves from a wide-angle end state to a telephoto end state;

providing the second lens group including, in order from the object, a first positive lens component, an aperture stop, a second positive lens component, and a negative lens; and satisfying the following conditional expression:

$$0.065 < D1/D2 < 0.3$$

where D1 denotes a distance along the optical axis between the second positive lens component and the negative lens, and D2 denotes a distance between the object side lens surface of the first positive lens component and an image plane in a wide-angle end state upon focusing on infinity.

17. The method for forming an image of an object and varying a focal length of a zoom lens system according to claim 16, further comprising a step of:

satisfying the following conditional expression:

$$-1.0 < D1/f1 \leq -0.27$$

where D1 denotes a distance along the optical axis between the second positive lens component and the negative lens, and f1 denotes a focal length of the first lens group.

18. The method for forming an image of an object and varying a focal length of a zoom lens system according to claim 16, further comprising a step of:

satisfying the following conditional expression:

$$0.25 < fw/f2 < 0.5$$

where fw denotes a focal length of the two-lens-group zoom lens system in the wide-angle end state, and f2 denotes a focal length of the second lens group.

* * * * *